United States Patent [19]
Bonnet et al.

[11] 4,277,750
[45] Jul. 7, 1981

[54] INDUCTION PROBE FOR THE MEASUREMENT OF MAGNETIC SUSCEPTIBILITY

[75] Inventors: Jean Bonnet, Chatillon; Julien Fournet, Connaux, both of France

[73] Assignee: Compagnie Generale des Matieres Nucleaires (COGEMA Groupe C.E.A.), Paris, France

[21] Appl. No.: 14,100

[22] Filed: Feb. 22, 1979

[30] Foreign Application Priority Data

Feb. 24, 1978 [FR] France ................ 78 05330

[51] Int. Cl.³ .................... G01R 33/16; G01V 3/28
[52] U.S. Cl. .................... 324/201; 324/225; 324/340; 324/343
[58] Field of Search ........... 324/326, 339, 340, 343, 324/239–243, 201, 232, 225

[56] References Cited

U.S. PATENT DOCUMENTS

| 3,061,775 | 10/1962 | Reznowski | 324/326 X |
| 3,510,757 | 5/1970 | Huston | 324/343 |

FOREIGN PATENT DOCUMENTS

| 2011369 | 2/1970 | France . | |
| 2303299 | 10/1976 | France . | |
| 371546 | 5/1973 | U.S.S.R. | 324/339 |

*Primary Examiner*—Gerard R. Strecker
*Attorney, Agent, or Firm*—Lane, Aitken, Ziems, Kice & Kananen

[57] ABSTRACT

The probe comprises two inductance windings mounted in opposition and connected to an a.c. generator, a measurement winding placed at right angles between the two inductance windings and a measurement voltage detector. A compensation winding is placed coaxially and symmetrically with the measurement winding in relation to the axis of the inductance windings, thus permitting enhanced sensitivity of the probe and a directional effect. Potential applications include continuous recording of magnetic susceptibility along a vertical borehole wall and ore sorting on a conveyor belt.

2 Claims, 3 Drawing Figures

INDUCTION PROBE FOR THE MEASUREMENT OF MAGNETIC SUSCEPTIBILITY

This invention relates to a probe for the measurement of magnetic susceptibility. One of the chief applications of the invention is in the technique of diagraphy, that is to say in the continuous recording of magnetic susceptibility of terrains along a borehole.

It is known that a probe for the measurement of magnetic susceptibility usually comprises two coaxial inductance windings mounted in opposition and connected to an alternating-current generator and a measurement winding placed between the two inductance windings, said measurement winding being connected to means for detecting an alternating-current voltage.

French patent Application No. 2,011,369 filed on June 16th, 1969 described a probe of this type in which the measurement winding is made up of turns disposed in planes at right angles to the axis of the probe. French Pat. No. 2,303,299 filed on Mar. 7th, 1975 and entitled "Method for the measurement of magnetic susceptibility of terrains by means of a probe" describes a probe in which the axis of the measurement winding is perpendicular to the axis of the inductance windings. The probe in accordance with the present invention is of the last-mentioned type.

The aim of the invention is to increase the sensitivity of this type of probe by producing a lateral focusing effect. To this end, the invention provides for the use of a compensation winding which is coaxial with the measurement winding and placed symmetrically with this latter in relation to the axis of the inductance windings.

The characteristic features and advantages of the invention will in any case become more readily apparent from the following description of exemplified embodiments which are given by way of explanation without any limitation being implied, reference being made to the accompanying drawings, wherein.

Figure 1:
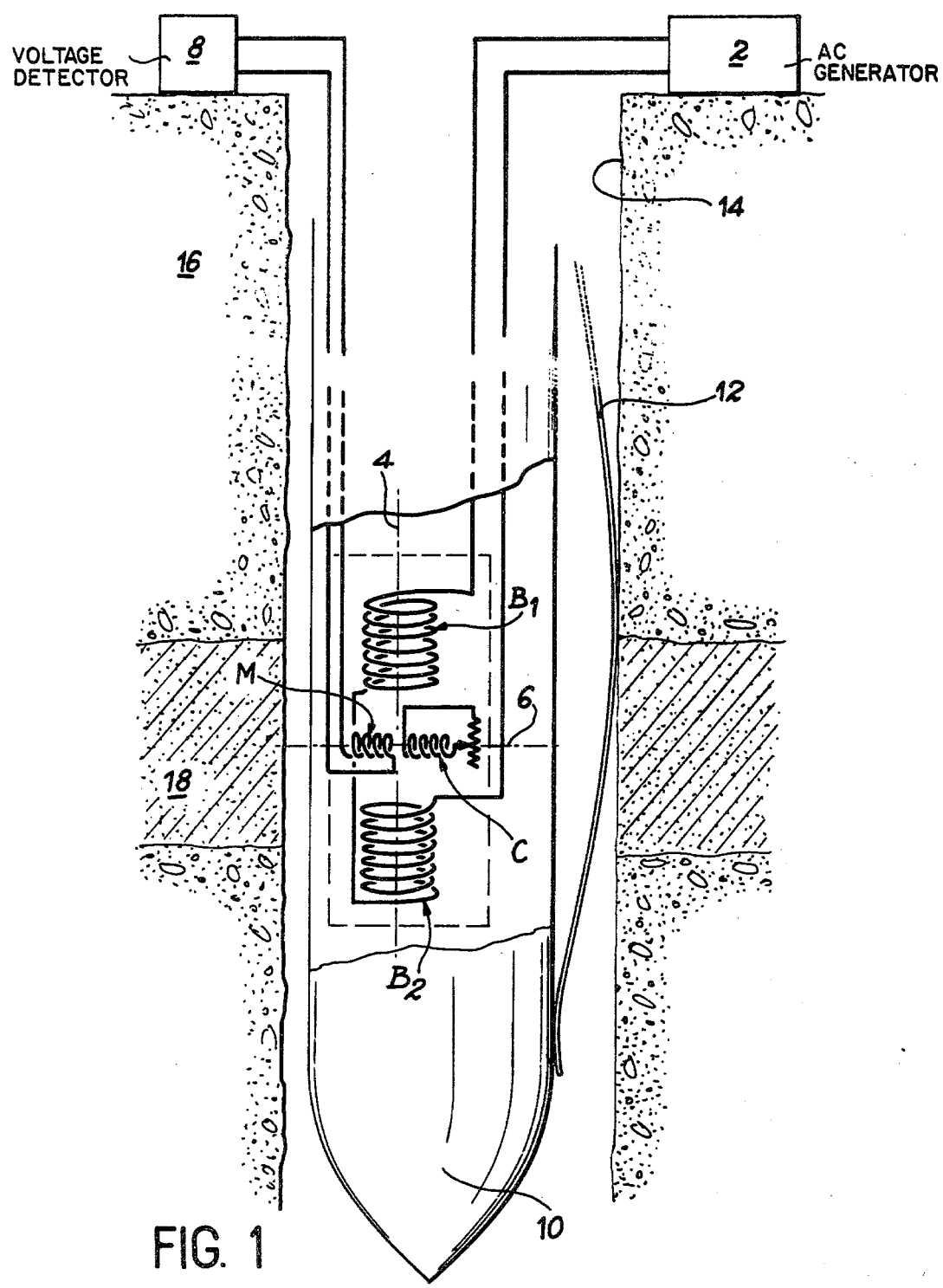
FIG. 1 is a general diagram of the probe which is adapted to the measurement of magnetic susceptibility of terrains.

The probe shown in FIG. 1 comprises two inductance windings $B_1$ and $B_2$ connected to an alternating-current generator 2, the windings $B_1$ and $B_2$ being combined and connected in such a manner as to ensure that the magnetic inductions introduced by these latter are opposite in direction; the windings $B_1$ and $B_2$ have an axis 4 which is parallel to the apparatus as a whole but displaced off-center. The probe further comprises a measurement winding M, the axis 6 of which is perpendicular to the axis 4 of the inductance windings. Said measurement winding is connected to means 8 for detecting the voltage which appears at its terminals. The probe is placed within a probe body 10 provided with at least one skid 12. The constructional details of said probe body will not be further discussed here since they are well known to those versed in the art and have been described in particular in the two patents cited earlier. The complete probe body is placed within a borehole 14 which extends through a terrain 16, the magnetic susceptibility of which is to be analyzed.

In accordance with the invention, the probe further comprises a compensation winding C which is coaxial with the measurement winding M and located symmetrically with this latter in relation to the axis 4 of the inductance windings.

The operation of the probe is as follows. When no magnetic (dia- or para-magnetic) bodies are present in the strata through which the borehole extends, the magnetic induction which passes through the measurement winding M is zero since the respective contributions of the two inductance windings $B_1$ and $B_2$ are perfectly compensated. The receiver 8 indicates a zero voltage.

When the probe passes through a dia- or para-magnetic stratum 18, a deformation of the magnetic induction lines takes place and produces a state of unbalance in the induced effects within the measurement winding. This accordingly results in the appearance of a signal at the terminals of said winding; the analysis of said signal makes it possible to determine the nature and extent of the magnetic stratum 18.

In devices of the prior art and especially in the device disclosed in French Pat. No. 2,303,299 cited above, the probe has low sensitivity since the magnetic stratum 18 usually surrounds the probe, with the result that the disturbing magnetic body is present both in front of and behind the probe.

The use of a compensation winding in accordance with the invention has the precise effect of increasing sensitivity since said winding behaves virtually as a screen which acquires a magnetic susceptibility of opposite sign to that of the external material traversed by the probe. It can be assumed by way of example that the stratum 18 is of paramagnetic nature. It is known that a body of this type has the effect of guiding the field lines originating from the inductance windings. In the case of FIG. 1, a non-zero induction appears in the windings M and C. However, since these windings are placed symmetrically with each other in relation to the axis of the inductors, the induction produced in the compensation winding reinforces the induction produced in the measurement winding. In fact, the density of the lines of force of the magnetic field within the winding M increases in value when a paramagnetic (or ferromagnetic) body is located opposite. However, this body usually consists of a stratum traversed by the borehole and surrounds the probe; in spite of the dissymmetry of the detector, the portion of the body which is opposite to M has an effect of opposite sign on this latter which is not negligible and more pronounced as the borehole is of smaller diameter. In point of fact, this effect produces a current within the formed loop C and said current in turn produces a field ("demagnetizing field"). This field is opposite to the field which produces it and therefore has the same sign as the sign applied to the winding M. The winding C behaves virtually as a diamagnetic body for the measurement winding by reversing the direction of contribution of the rear magnetic effects. The sensitivity of the probe is therefore improved and a directional effect is also obtained. It is readily apparent that, if the stratum of terrain traversed is diamagnetic, the compensation winding behaves as a paramagnetic body, thus further neutralizing the rear effect produced on the measurement winding.

Figures 2, 3:
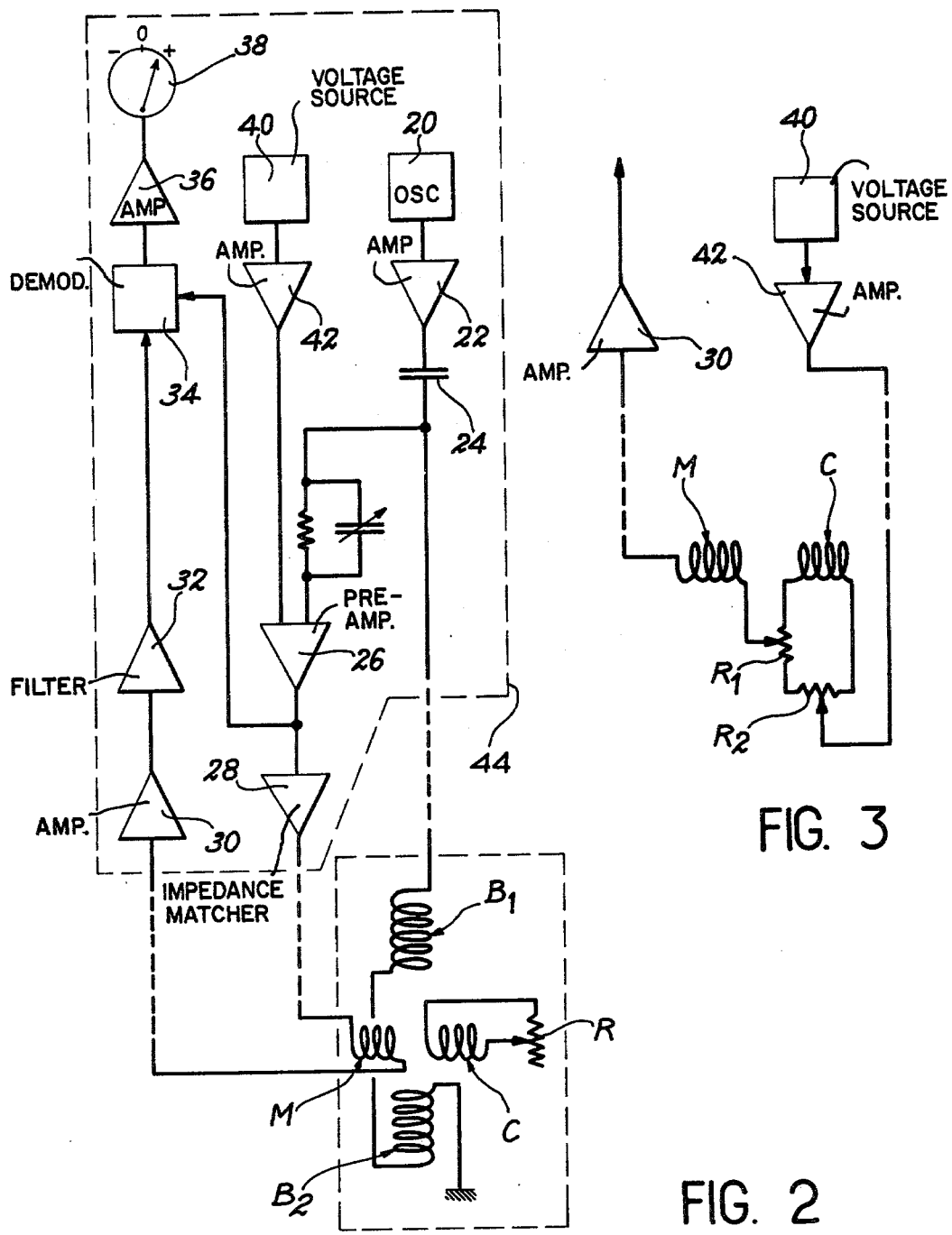
FIG. 2 is a layout diagram of the electronic supply and measurement circuits.
FIG. 3 shows a particular mode of connection of the measurement and compensation circuits.

FIG. 2 shows a diagram of the circuits which are advantageously employed with the probe described in the foregoing. These circuits are designed to permit the production of a measurement signal which is positive when the body encountered is paramagnetic and which is negative when the body is diamagnetic. Under these conditions, the probe provides not only the value of magnetic susceptibility but also its sign.

The circuit shown in FIG. 2 comprises a generator 20 constituted for example by a control oscillator which operates at 18 kHz, followed by an amplifier 22 and a coupling capacitor 24. The alternating-current voltage delivered by these supply means is applied to two inductance windings $B_1$ and $B_2$. Moreover, part of this voltage is applied to the measurement winding M by a preamplifier 26 and an impedance-matching device 28. The voltage collected at the terminals of the measurement winding M is amplified by a circuit 30, then frequency-filtered by a circuit 32 of the band-pass type which is centered on the frequency of the oscillator 20. The filtered voltage is then applied to a demodulator 34 which receives part of the voltage delivered by the amplifier 26. The demodulated signal is amplified by a direct-current amplifier 36, then applied to a measuring instrument 38 having two polarities and constituted, for example, by a recorder having a number of different sensitivities. A voltage generator 40 connected to an amplifier 42 constitutes a circuit for resetting the system to zero.

In the case of a system for measuring magnetic susceptibility of terrains, the unit 44 which comprises all the above-mentioned circuits is placed at the surface of the ground in which the borehole has been drilled. Said unit can be fed from a 14 V d.c. voltage supply, for example.

In regard to the probe proper, FIG. 2 shows a compensation winding C which is closed on a variable resistor R. Said resistor can have a value of the order of a few ohms, for example. The compensation winding can be constituted by a few turns which are wound in the appropriate direction.

It will be observed that, by virtue of the small dimensions of the probe and the fact that the inductance windings are mounted in opposition, temperature variations of the environment have practically no effect on the measurement. Moreover, since the electronic receiving circuit is tuned to the excitation frequency, the measurement is not liable to be affected by any disturbance resulting from fields of different frequency or from constant fields.

In the absence of paramagnetic or diamagnetic bodies, the fluxes of the inductance windings are in opposition in the measurement winding M and no voltage must appear on the measuring instrument 38. Should a small voltage appear on said instrument, the zero-reset circuit 40 and 42 would be put into operation in order to nullify said voltage.

The circuit shown in FIG. 3 is an alternative embodiment in which the compensation winding C is closed on two variable resistors $R_1$ and $R_2$, the resistor $R_2$ being connected to the zero-reset means 40 and 42. In this alternative embodiment, the measurement winding M has a point which is connected to the compensation winding.

It can readily be understood that the application to diagraphy mentioned in the foregoing description was given solely by way of illustration and that the probe in accordance with the invention could be used in other applications such as the sorting of ore on a conveyor-belt, for example.

What we claim is:

1. A probe for the measurement of magnetic susceptibility of the type comprising an axis and two coaxial inductance windings for generating two magnetic inductions opposite in direction, said windings being mounted in opposition and having an axis parallel to the axis of the probe and being connected to a generator for producing alternating current at a predetermined frequency, and a measurement winding for measuring a magnetic induction between said two coaxial inductance windings, said measurement winding being placed between the two inductance windings and off-center with respect to said axis of said inductance windings, said measurement windings having an axis perpendicular to the axis of said two inductance windings, said measurement winding being connected to means for detecting a voltage at the frequency of said generator, wherein said measurement probe further comprises a compensation winding for reinforcing the induction produced in the measurement winding, said compensation winding being off-center with respect to the axis of said two coaxial inductance windings, said compensation winding being symmetrical with said measurement winding with respect to said axis of said two coaxial inductance windings.

2. A probe according to claim 1, wherein the compensation winding is closed on a variable resistor.

* * * * *